United States Patent
Zahn et al.

(10) Patent No.: US 10,572,005 B2
(45) Date of Patent: Feb. 25, 2020

(54) PRIVATE COMMUNICATION WITH GAZING

(71) Applicant: Microsoft Technology Licensing, LLC, Redmond, WA (US)

(72) Inventors: Jessica Ellen Zahn, Redmond, WA (US); Peter William Carlson, Redmond, WA (US); Shawn Crispin Wright, Sammamish, WA (US); Eric Scott Rehmeyer, Kirkland, WA (US); John Copic, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 56 days.

(21) Appl. No.: 15/224,291

(22) Filed: Jul. 29, 2016

(65) Prior Publication Data
US 2018/0034867 A1 Feb. 1, 2018

(51) Int. Cl.
*G06F 3/01* (2006.01)
*H04L 12/18* (2006.01)
(Continued)

(52) U.S. Cl.
CPC ......... *G06F 3/013* (2013.01); *G02B 27/0172* (2013.01); *G06F 1/163* (2013.01);
(Continued)

(58) Field of Classification Search
CPC ............... H04L 65/4015; H04L 65/403; H04L 65/1069; H04L 51/046; H04N 7/157;
(Continued)

(56) References Cited

U.S. PATENT DOCUMENTS 7,386,799 B1 6/2008 Clanton et al.
8,191,001 B2 5/2012 Van Wie et al.
(Continued)

FOREIGN PATENT DOCUMENTS

WO 3058518 A2 7/2003

OTHER PUBLICATIONS

Colburn, et al., "The Role of Eye Gaze in Avatar Mediated Conversational Interfaces", in Technical Report of MSR-TR-2000-81, Jul. 31, 2000, 10 pages.
(Continued)

*Primary Examiner* — Premal R Patel
(74) *Attorney, Agent, or Firm* — Alleman Hall Creasman & Tuttle LLP

(57) ABSTRACT

Content from a user computing device may be transmitted to at least one recipient computing device. A plurality of avatars is displayed that each represent different recipients associated with recipient computing devices. A group communication session is established among the user computing device and the recipient computing devices. During the group communication session: initial content is transmitted from the user computing device to each recipient computing device; based on determining that the user is gazing at a selected avatar, a private communication session is established between the user computing device and the recipient computing device associated with the selected avatar. During the private communication session, subsequent content is transmitted from the user computing device to such recipient computing device, and is not transmitted to the other recipient computing devices.

16 Claims, 8 Drawing Sheets

US 10,572,005 B2
Page 2

(51) Int. Cl.
| | | |
|---|---|---|
| *G06F 1/16* | (2006.01) | |
| *G06F 3/0484* | (2013.01) | |
| *G02B 27/01* | (2006.01) | |
| *G06F 3/0482* | (2013.01) | |
| *G06F 3/0487* | (2013.01) | |
| *G06F 3/16* | (2006.01) | |
| *G06T 19/00* | (2011.01) | |
| *H04L 12/58* | (2006.01) | |
| *H04L 29/06* | (2006.01) | |
| *H04N 7/14* | (2006.01) | |
| *H04N 7/15* | (2006.01) | |

(52) U.S. Cl.
CPC ............ *G06F 1/1698* (2013.01); *G06F 3/011* (2013.01); *G06F 3/0482* (2013.01); *G06F 3/0487* (2013.01); *G06F 3/04842* (2013.01); *G06F 3/16* (2013.01); *G06T 19/006* (2013.01); *H04L 12/1822* (2013.01); *H04L 51/046* (2013.01); *H04L 65/1069* (2013.01); *H04L 65/403* (2013.01); *H04L 65/4015* (2013.01); *H04N 7/147* (2013.01); *H04N 7/157* (2013.01); *G02B 2027/0174* (2013.01); *G06F 2203/04804* (2013.01)

(58) Field of Classification Search
CPC .. H04N 7/147; G06T 19/006; G02B 27/0172; G02B 2027/0174; G06F 2203/04804; G06F 3/16; G06F 3/0482; G06F 3/013; G06F 3/0487
See application file for complete search history.

(56) References Cited

U.S. PATENT DOCUMENTS

| | | | | |
|---|---|---|---|---|
| 9,451,210 | B1* | 9/2016 | Smus | H04N 7/15 |
| 2009/0063995 | A1 | 3/2009 | Baron et al. | |
| 2009/0254843 | A1* | 10/2009 | Van Wie | H04L 12/1822 |
| | | | | 715/757 |
| 2012/0295708 | A1 | 11/2012 | Hernandez-Abrego et al. | |
| 2012/0331397 | A1* | 12/2012 | Eidelson | G06Q 10/107 |
| | | | | 715/751 |
| 2013/0293468 | A1* | 11/2013 | Perez | G06F 3/033 |
| | | | | 345/158 |
| 2014/0125698 | A1* | 5/2014 | Latta | G06F 3/011 |
| | | | | 345/633 |
| 2014/0128161 | A1* | 5/2014 | Latta | A63F 13/06 |
| | | | | 463/42 |
| 2014/0184550 | A1 | 7/2014 | Hennessey et al. | |
| 2014/0320389 | A1* | 10/2014 | Scavezze | G06F 3/011 |
| | | | | 345/156 |
| 2015/0062159 | A1* | 3/2015 | Hildreth | G02B 27/0172 |
| | | | | 345/633 |
| 2015/0119130 | A1* | 4/2015 | Lovitt | A63F 13/00 |
| | | | | 463/23 |
| 2015/0268821 | A1 | 9/2015 | Ramsby et al. | |
| 2015/0317832 | A1 | 11/2015 | Ebstyne et al. | |
| 2016/0077785 | A1* | 3/2016 | Sugden | G02B 27/017 |
| | | | | 345/8 |
| 2016/0357252 | A1* | 12/2016 | Gavriliuc | H04N 13/0484 |
| 2016/0380943 | A1* | 12/2016 | van Rensburg | H04L 65/1093 |
| | | | | 709/206 |
| 2017/0004655 | A1* | 1/2017 | Scavezze | G06F 3/011 |
| 2017/0061694 | A1* | 3/2017 | Giraldi | G06T 19/006 |
| 2017/0213473 | A1* | 7/2017 | Ribeira | G09B 9/00 |
| 2017/0262154 | A1* | 9/2017 | Black | G06F 3/04815 |
| 2017/0269685 | A1* | 9/2017 | Marks | G06F 3/013 |
| 2017/0269713 | A1* | 9/2017 | Marks | G06F 3/0346 |
| 2017/0294072 | A1* | 10/2017 | Achmuller | G07F 17/3225 |
| 2017/0322623 | A1* | 11/2017 | McKenzie | G06F 3/013 |
| 2017/0324841 | A1* | 11/2017 | Clement | H04L 67/38 |

OTHER PUBLICATIONS

Sundstedt, Veronica, "Eye Tracking in Video Games", Retrieved on: Dec. 29, 2015 Available at: https://books.google.co.in/books?id=IZleAQAAQBAJ&pg=PA36&lpg=PA36&dq=.

Bates, et al., "Gaze interaction with virtual on-line communities: levelling the playing field for disabled users", in Journal of Universal Access in the Information Society, vol. 9, Issue 3, Aug. 2010, 6 pages.

Castellina, et al., "Multimodal Gaze interaction in 3D Virtual Environments", in Proceedings of the 4th Conference on Communication by Gaze Interaction, Sep. 2, 2008, pp. 1-5.

"Xbox Live chat on the Xbox 360 console" retrieved on May 26, 2016 Available at: https://support.xbox.com/en-US/xbox-360/xbox-live/chat.

"International Search Report and Written Opinion Issued in PCT Application No. PCT/US2017/042958", dated Oct. 5, 2017, 15 Pages.

* cited by examiner

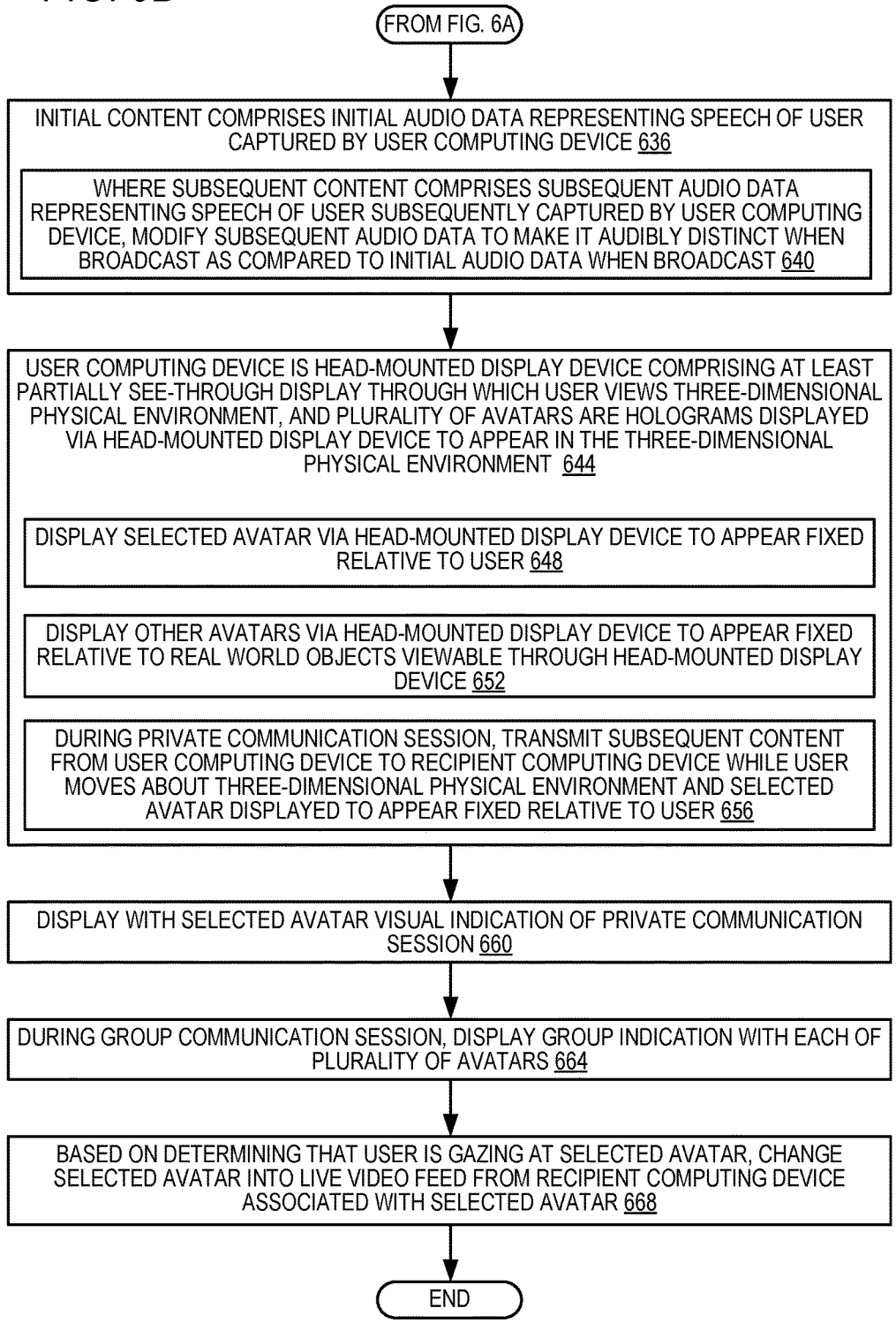

PRIVATE COMMUNICATION WITH GAZING

BACKGROUND

Multiple users of computing devices may engage in group computing activities, such as multiplayer gaming. During such group computing activities, the multiple users may have group conversations in which one or more members of the group communicates in real time with the other members of the group.

SUMMARY

Various examples are disclosed herein that relate to gazing at an avatar to establish a private communication session. In one example, a plurality of avatars is displayed to a user of a user computing device, wherein each of the avatars represents a different recipient, and each of the different recipients is associated with a different recipient computing device. A group communication session is established among the user computing device and each of the different recipient computing devices.

During the group communication session, initial content is transmitted from the user computing device to each of the different recipient computing devices. It is determined that the user of the user computing device is gazing at a selected avatar of the plurality of avatars. Based on determining that the user is gazing at the selected avatar, a private communication session is established between the user computing device and the recipient computing device that is associated with the selected avatar. During the private communication session, subsequent content is transmitted from the user computing device to the recipient computing device that is associated with the selected avatar, and the subsequent content is not transmitted to the one or more other recipient computing devices that are associated with the one or more other avatars of the plurality of avatars.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 6A and 6B are a flow chart of a method for transmitting content from a user computing device to at least one recipient computing device according to an example of the present disclosure.

DETAILED DESCRIPTION

Figure 1:
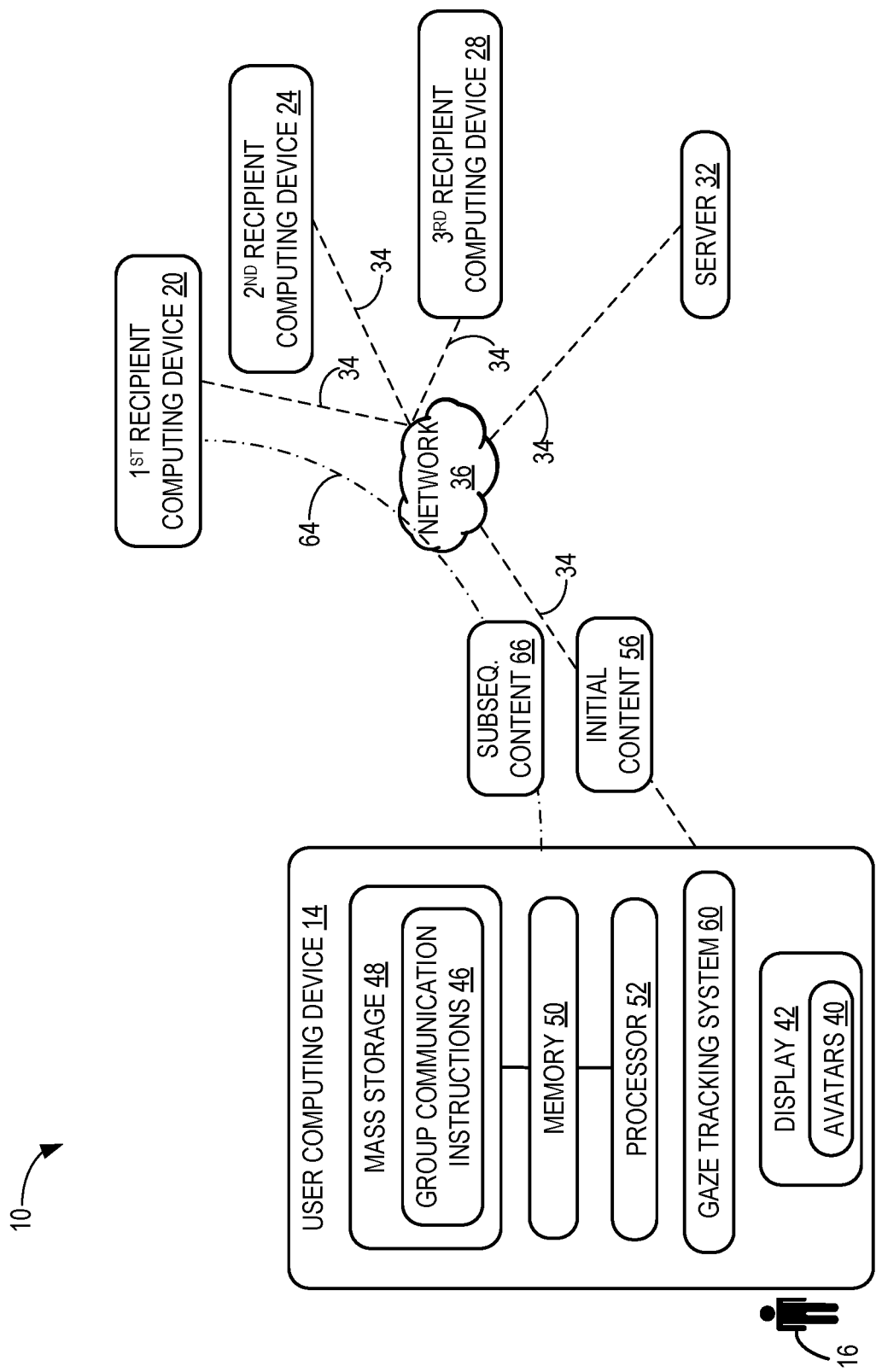
FIG. 1 shows a user computing device transmitting content to recipient computing devices according to an example of the present disclosure.

FIG. 1 shows a schematic view of one example of a system 10 for transmitting content from a user computing device 14 to one or more recipient computing devices that are each associated with a different recipient. As described in more detail below, in some examples a user 16 of the user computing device 14 may engage in online activities that include real-time interactions with other users/players, such as a multiplayer video game, a massively multiplayer online game, a virtual world, etc. In other examples, a user may participate in other online activities that involve real-time interactions with other online participants, such as online courses for distance education, video conference meetings, etc.

In the example of FIG. 1, user 16 of user computing device 14 may be participating in an online activity with other users associated with other computing devices, such as first recipient computing device 20, second recipient computing device 24 and third recipient computing device 28. For example, such users may be playing a multiplayer online game that is provided by a server 32. In some examples, additional users of additional computing devices (not shown) also may be participating in the multiplayer online game.

User computing device 14 may be communicatively coupled to the first recipient computing device 20, second recipient computing device 24, and third recipient computing device 28 via a wired or wireless connection to a network 36. In some examples, the network 36 may take the form of a local area network (LAN), wide area network (WAN), wired network, wireless network, personal area network, or a combination thereof, and may include the Internet.

As described in more detail below, the user computing device 14 also may display to user 16 a plurality of avatars 40 via a display 42, wherein each of the avatars represents a different recipient associated with one of the recipient computing devices. Such avatars may comprise two dimensional images or three dimensional images (such as holograms). The computing device 14 includes group communication instructions 46 that may be stored in mass storage 48 of the user computing device 14. The group communication instructions 46 may be loaded into memory 50 and executed by a processor 52 of the user computing device 14 to perform one or more of the methods and processes described in more detail below.

In some examples and as described in more detail below, when participating in an online activity with other users, a group communication session may be established in which the user computing device 14 is communicatively coupled with other recipient computing devices. In the example of FIG. 1, user computing device 14 may be communicatively coupled to the first recipient computing device 20, second recipient computing device 24, and third recipient computing device 28 in a group communication session indicated by dotted line 34.

In such a group communication session, the users of the various computing devices participating in the session may transmit and receive content from one another. For example, group communication session participants may have an audio conversation or a streaming video interaction in which audio and/or video data is captured by each participant's computing device and shared among all of the participants. In the example of FIG. 1 and as described in more detail below, during a group communication session the user computing device 14 may transmit initial content 56 (such as audio data) to each of the first recipient computing device 20, second recipient computing device 24, and third recipient computing device 28. In some examples, the group communication session participants may be a subset of a larger community of users who are also engaged in the online activity. In other examples, the user computing device 14 may be communicatively coupled to any suitable number of recipient computing devices in a group communication session.

In some examples and as described in more detail below, while participating in a group communication session, user 16 may desire to have a private conversation with one or more of the participants in the session. For example, the user 16 may desire to have a private audio conversation with the recipient/user of the first recipient computing device 20. A gaze tracking system 60 of the user computing device 14 may determine that the user 16 is gazing at the avatar that represents the recipient/user of the first recipient computing device 20.

Based on determining that the user 16 is gazing at the selected avatar, the group communication instructions may be executed to establish a private communication session, indicated by dot-dash line 64, between the user computing device 14 and the first recipient computing device 20 that is associated with the selected avatar. During the private communication session, the user computing device transmits subsequent content 66 to the first recipient computing device 20, and does not transmit the subsequent content to the second recipient computing device 24 or third recipient computing device 28.

In this manner and in one example, the user 16 and the recipient/user of the first recipient computing device 20 may have a private audio conversation that is not heard by the recipients/users of the second recipient computing device 24 and third recipient computing device 28. Accordingly, and in one potential advantage of the present disclosure, the user 16 may conveniently and quickly establish a private communication session with another participant of the group communication session by directing the user's gaze at the selected avatar representing the participant.

In the example of FIG. 1, the private communication session 64 may be established via the same network that is facilitating the group communication session 34. In other examples, a private communication session may be established via another network that is different from the network that facilitates the group communication session. For example, user computing device 14 may establish a separate personal area network connection with another recipient computing device for exchanging data via a private communication session.

In different examples the user computing device and recipient computing devices may be any one of a variety of types and form factors. For example, the user computing device 14 and/or recipient computing device(s) may comprise a wearable computing device, such as a head-mounted display (HMD) device, tablet computer, laptop computer, smartphone, or other mobile computing device, set-top box, home entertainment computer, interactive television, gaming system, desktop computing device, standalone monitor, wall-mounted display, or other like device. Additional details regarding the components and computing aspects of the user computing device 14 and recipient computing devices are described in more detail below with reference to FIG. 7.

Figure 2:
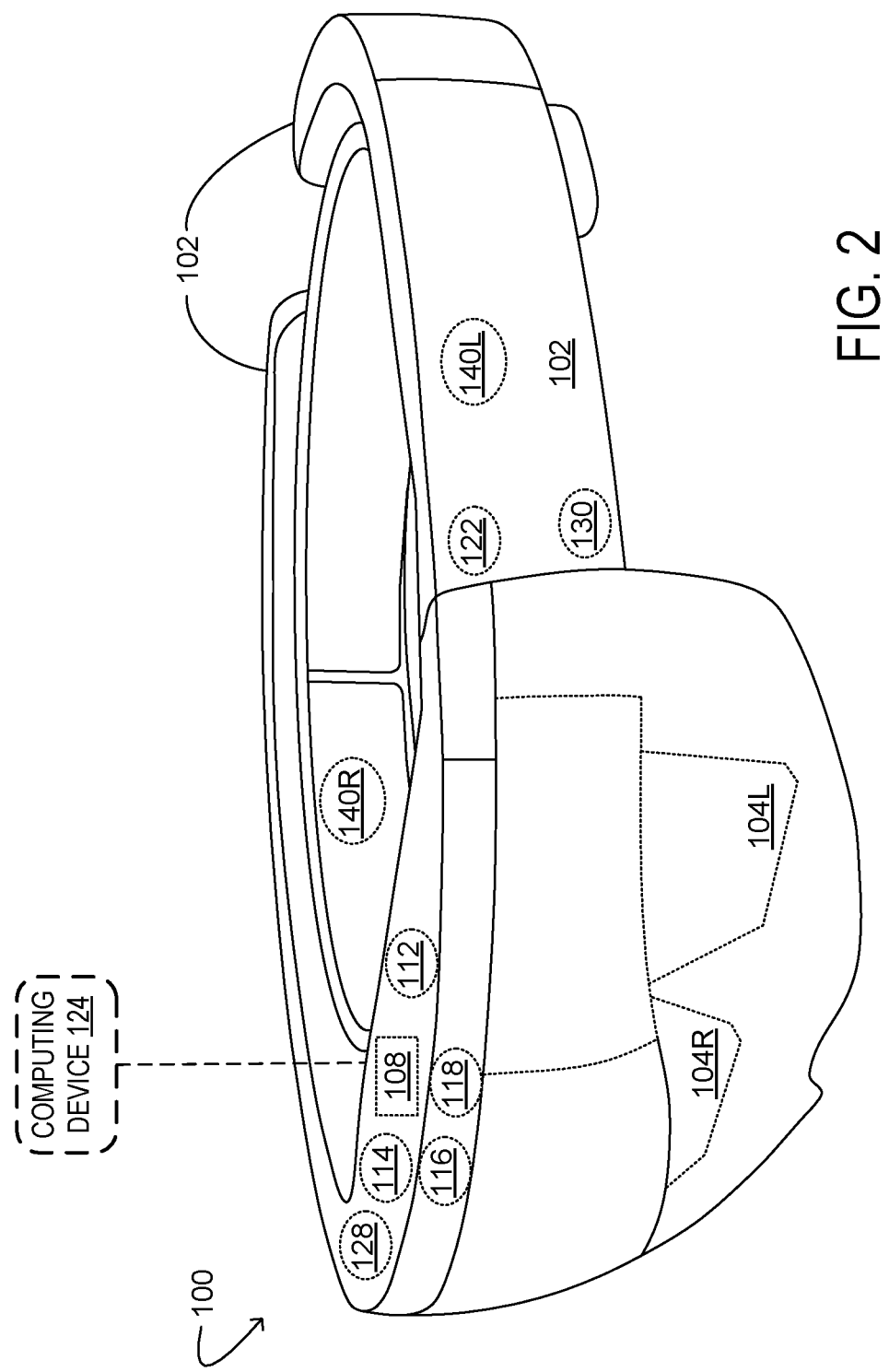
FIG. 2 shows a schematic view of a head-mounted display device according to an example of the present disclosure.

In some examples and as noted above, the user computing device 14 and/or one or more recipient computing devices may comprise an HMD device. In some examples, the HMD device may comprise an augmented reality display device. The augmented reality display device may include an at least partially see-through display configured to visually augment a view of a three dimensional physical environment through the display. FIG. 2 illustrates an HMD device 100 that may be worn by a user according to an example of the present disclosure. In other examples an HMD device may take any other suitable form in which an at least partially see-through display is supported in front of a viewer's eye or eyes.

In the example of FIG. 2, the HMD device 100 includes a frame 102 that wraps around the head of a user to position at least partially see-through right display panel 104R and at least partially see-through left display panel 104L close to the user's eyes. The frame supports additional stereoscopic, see-through display componentry as described in more detail below. HMD device 100 may be used in augmented-reality applications, where virtual display imagery is mixed with real-world imagery.

In this example HMD device 100 includes separate right and left display panels, 104R and 104L, which may be wholly or partially transparent from the perspective of the user, to give the user a clear view of his or her surroundings. A processor 108 is operatively coupled to the display panels 104R and 104L and to other display-system componentry. The processor 108 includes logic and associated computer memory configured to provide image signals to the display panels 104R and 104L, to receive sensory signals, and to enact various control processes described herein.

The display panels 104R and 104L facilitate the delivery of holographic images to the eyes of a wearer of the HMD device 100. In this manner, the display panels 104R and 104L may be configured to visually augment an appearance of a real-world, three dimensional physical environment to a wearer viewing the physical environment through the panels.

Any suitable display technology and configuration may be used to display images via the at least partially see-through display panels 104R and 104L. For example, the panels may be configured to enable a wearer of the HMD device 100 to view a physical, real-world object in the physical environment through one or more partially transparent pixels that are displaying a virtual object representation. For example, the panels may include image-producing elements such as, for example, a see-through Organic Light-Emitting Diode (OLED) display.

As another example, the HMD device 100 may include a light modulator on an edge of the panels. In this example, the panels may serve as a light guide for delivering light from the light modulator to the eyes of a wearer. In other examples, the display panels may utilize a liquid crystal on silicon (LCOS) display. Additionally, while the example of FIG. 2 shows separate right and left display panels 104R and 104L, a single display panel extending over both eyes may be used in other examples.

The HMD device 100 may also include various sensors and related systems to provide information to the processor 108. Such sensors may include, but are not limited to, one or more inward facing image sensors 112, 114, one or more outward facing image sensors 116, 118, an inertial measurement unit (IMU) 122, and one or more microphones 130.

The HMD device 100 also may include stereo loudspeakers 140R and 140L to broadcast audio to the wearer. The one or more inward facing image sensors 112, 114 may be configured to acquire image data in the form of gaze tracking data from a wearer's eyes (e.g., sensor 112 may acquire image data from one of the wearer's eyes, and sensor 114 may acquire image data from the other of the wearer's eye).

The processor 108 may execute instructions to determine gaze directions of each of a wearer's eyes in any suitable manner based on the information received from the image sensors 112, 114. For example, one or more light sources, such as infrared light sources, may be configured to cause a glint of light to reflect from the cornea of each eye of a wearer. The one or more image sensors 112, 114 may be configured to capture an image of the wearer's eyes. Images of the glints and of the pupils as determined from image data gathered from the image sensors may be used to determine an optical axis of each eye. Using this information, the processor 108 may execute instructions to determine a direction in which the wearer is gazing. In some examples, such gaze tracking data may be used to determine that the wearer is gazing at a real world object in the physical environment or at a particular image or hologram, such as an avatar, displayed by the HMD device 100.

In other implementations, a different type of gaze sensor may be employed in the HMD device 100 to measure one or more gaze parameters of the user's eyes. Examples of gaze parameters measured by one or more gaze sensors may include an eye gaze direction or gaze vector, head orientation, eye gaze velocity, eye gaze acceleration, change in angle of eye gaze direction, and/or any other suitable tracking information.

The one or more outward facing image sensors 116, 118 may be configured to capture and/or measure physical environment attributes of the physical environment in which the HMD device 100 is located. In one example, image sensor 116 may include a visible-light camera configured to collect a visible-light image of a physical space. Further, the image sensor 118 may include a depth camera configured to collect a depth image of a physical space. More particularly, in one example the depth camera is an infrared time-of-flight depth camera. In another example, the depth camera is an infrared structured light depth camera.

Data from the outward facing image sensors 116, 118 may be used by the processor 108 to generate and/or update a three dimensional (3D) model of the physical environment. Data from the outward facing image sensors 116, 118 may be used by the processor 108 to identify surfaces of the physical space and/or measure one or more surface parameters of the physical space. The processor 108 may execute instructions to generate/update 3D models and identify surfaces of the physical space in any suitable manner. In one example, depth maps derived from depth data provided by the depth camera of image sensor 118 may be used to generate/update 3D models and identify surfaces of the physical space.

Data from the outward facing image sensors 116, 118 also may be used by the processor 108 to detect movements within a field of view of the HMD device 100, such as gesture-based inputs or other movements performed by a wearer or by a person or physical object within the field of view. In one example, data from the outward facing image sensors 116, 118 may be used to detect user input performed by the wearer of the HMD device 100, such as a gesture that indicates an action to be taken, a selection of a hologram or other virtual object displayed via the display device, or other command.

Data from the outward facing image sensors 116, 118 also may be used by the processor 108 to determine direction/location and orientation data (e.g., from imaging environmental features) that enables position/motion tracking of the HMD device 100 in the real world physical environment. Data from the outward facing image sensors 116, 118 may be used by the processor 108 to construct still images and/or video images of the surrounding environment from the perspective of the HMD device 100.

Additionally or alternatively, information from outward facing image sensors 116, 118 and/or other sensors may be communicated to a remote computing device 124 responsible for generating and updating a model of the physical space. The HMD device 100 may be communicatively coupled to remote computing device 124 and/or other device (s) via a wired connection or a wireless connection to a network, such as network 36.

Computing device 124 may take the form of a server, networking computer, gaming console, mobile communication device, wearable computing device, desktop computer, laptop computer, tablet computer, set-top box (e.g. cable television box, satellite television box), or any other type of suitable computing device. In some examples, computing device 124 may comprise an embedded system within a larger electronic or mechanical device or system. Additional details regarding the components and computing aspects of the computing device 124 are described in more detail below with respect to FIG. 7.

In some examples, user computing device 14 and/or one or more recipient computing devices may comprise an HMD device in the form of a virtual reality display device. A virtual reality display device may include a non-see-through display configured to provide an immersive virtual reality experience. The virtual reality display device may include head motion tracking sensors, gaze tracking systems, and other components and functionality described above for HMD device 100.

In some examples, user computing device 14 and/or one or more recipient computing devices may comprise a set-top box, gaming console or other dedicated hardware that utilizes a separate display and includes head motion tracking sensors, depth tracking sensor systems, gaze tracking systems, and/or other components and functionality described above for HMD device 100.

Figure 3:
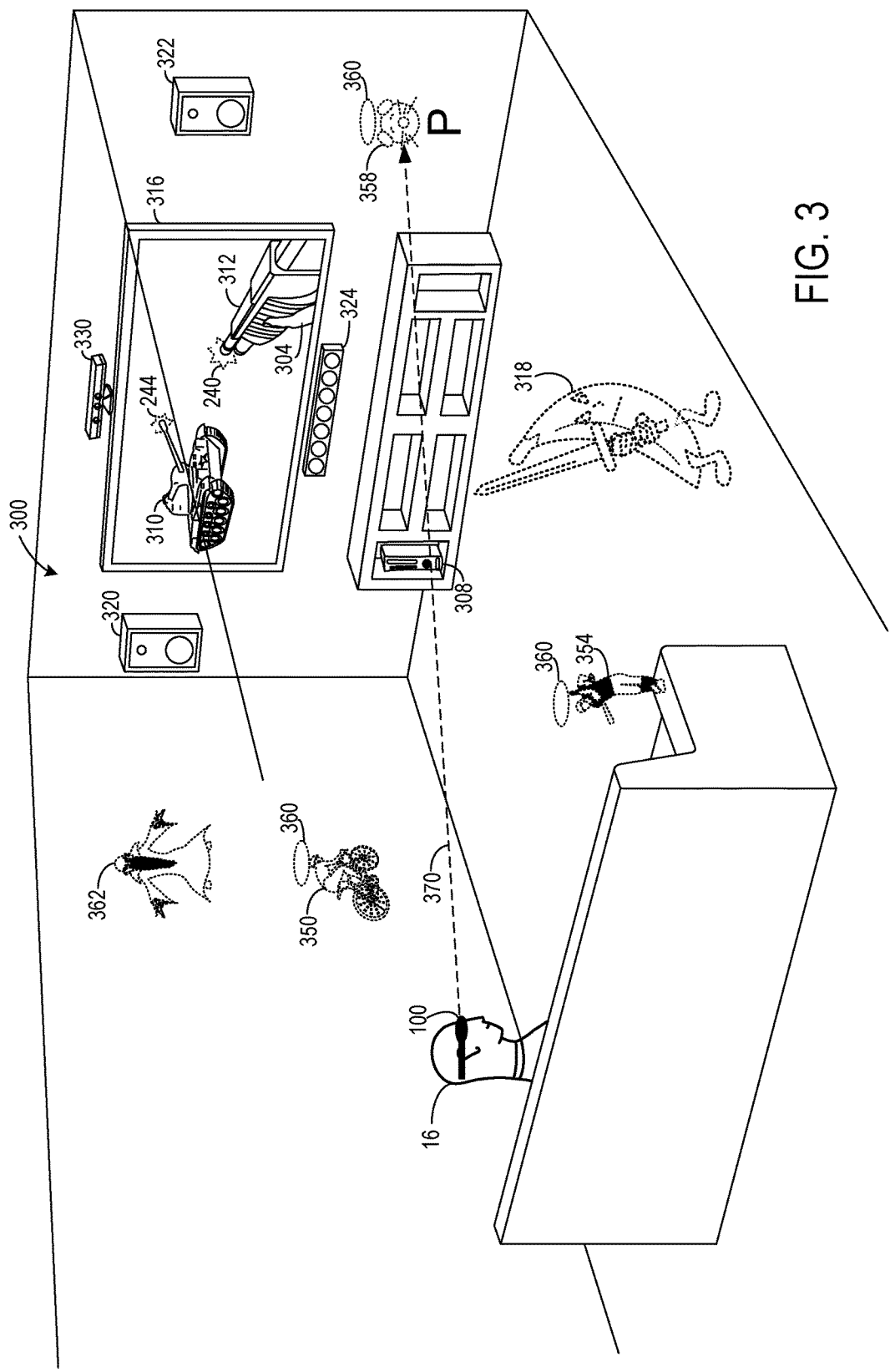
FIG. 3 shows a schematic perspective view of a room including multiple people and various computing devices for sharing content according to examples of the present disclosure.

With reference now to FIG. 3, descriptions of example use cases of the present disclosure will now be provided. In the example of FIG. 3, a user 16 may sit in living room 300 and may wear a user computing device in the form of an HMD device, such as HMD device 100. The user 16 may play a multiplayer online game in the form of a first-person shooter game that comprises an interactive digital environment including a user-controlled element 304 (e.g., first-person humanoid character). The game may be executed by the HMD device 100 and/or a gaming console 308 that displays images, such as the user-controlled element 304, tank 310 and gun 312, on a wall-mounted display 316.

In some examples, the HMD device 100 may display the images from the game as two dimensional images or three dimensional holograms located in the room 300. Additionally, while the user-controlled element 304 is illustrated as being presented via display 316 in a "first-person" view, it will be appreciated that the user-controlled element may comprise any suitable visual representation.

In some examples, other elements of the online game may be displayed to user 16 via the HMD device 100. In the example of FIG. 3, an element of the game in the form of a sword-wielding holographic banana 318 may be displayed via the HMD device 100. Additionally and as described in more detail below, one or more avatars representing other players of the multiplayer online game may be displayed to user 16 via the HMD device 100, or may be displayed on the wall-mounted display 316.

The user-controlled element 304 may be controlled via input to the HMD device 100, a hand-held game controller (not shown), or via additional and/or different input devices including, but not limited to, keyboards, mice, microphones for voice recognition, and the like. Audio content may be broadcast to user 16 via stereo loudspeakers 140R and 140L of the HMD device 100 and/or via speakers 320, 322, and 324 in the living room 300.

In other examples, user 16 may participate in the multiplayer online game via the wall-mounted display 316 without wearing an HMD device. For example, user-controlled element 304 may be controlled based on the movement(s) of the user 16 that are imaged by a tracking system 330. To track such movements, the tracking system 330 may include an optical sensor system and depth tracking functionality that may be similar to the sensors and functionality described above for the HMD device 100. In these examples, audio content may be broadcast to user 16 via headphones (not shown) worn by the user and/or via speakers 320, 322, and 324 in the living room 300.

As noted above, one or more avatars may be displayed to user 16 via the HMD device 100 or may be displayed on the wall-mounted display 316. An avatar may represent another player of the multiplayer online game, another member of an online community of which user 16 is a member, or other person with whom user 16 has an online connection. As noted above with reference to FIG. 1, each person/recipient may be associated with a different recipient computing device.

In some examples while playing the multiplayer online game, user 16 may establish a group communication session that enables the user and one or more other players to exchange content, such as audio data, streaming video data, and/or other data files (image files, audio files, etc.). In one example, a group communication session may include the user 16 and 3 other recipients (players) engaging in a real-time audio conversation to discuss their game-playing experience. As shown in FIG. 3, in this example the HMD device 100 may display a first avatar 350, second avatar 354 and third avatar 358 that correspond to a first recipient Amy, second recipient Ben and third recipient Carlos, respectively.

In this example, each of the first avatar 350, second avatar 354 and third avatar 358 is displayed by HMD device 100 as a hologram located in the three dimensional physical environment of the living room 300. As noted above, the user 16 and first recipient Amy, second recipient Ben and third recipient Carlos may engage in a group communication session comprising a real-time audio conversation to discuss their game-playing experience via their respective computing devices. For example, audio content comprising spoken utterances of user 16 may be captured by a microphone of HMD device 100, and may be transmitted from HMD device 100 to each of the first recipient computing device 20, second recipient computing device 24 and third recipient computing device 28 that correspond first recipient Amy, second recipient Ben and third recipient Carlos, respectively. Similarly, audio content from the first recipient computing device 20, second recipient computing device 24 and/or third recipient computing device 28 may be shared among the four participating computing devices of the group communication session.

In some examples, one or more other avatars corresponding to person(s) who are not participating in the group communication session also may be displayed to user 16. In the example of FIG. 3, a fourth avatar 362 representing another player Daniel, who may be participating in the online multiplayer game but not participating in the group communication session, may be displayed to user 16.

In some examples during a group communication session, a grouping indication also may be displayed to visually indicate which avatars and corresponding recipients are participating in the group communication session. In the example of FIG. 3, a grouping indication in the form of a group halo 360 may be displayed with each of the first avatar 350, second avatar 354 and third avatar 358 that correspond to first recipient Amy, second recipient Ben and third recipient Carlos, respectively, to indicate that they are participating in the group communication session. Correspondingly, a group halo 360 is not displayed with the fourth avatar 362 representing player Daniel who is not participating in the group communication session. In this manner, user 16 may quickly and easily see which players are participating in the group communication session, and which player(s) are not participating.

Additionally, while the example of FIG. 3 shows a group indication in the form of group halo 360, it will be appreciated that many other forms, shapes and visual indications may be utilized to designate participation in a group communication session. For example, other visual indications having other shapes, sizes, etc. may be displayed in various manners with the avatars associated with players who are participating in a group communication session. For example, a square, circle or other shape may enclose each such avatar. In addition or alternatively, in other examples the avatars associated with players who are participating may be visually augmented in a distinctive manner, such as by glowing or pulsing, being displayed in a particular color or highlight, etc.

Figure 4:
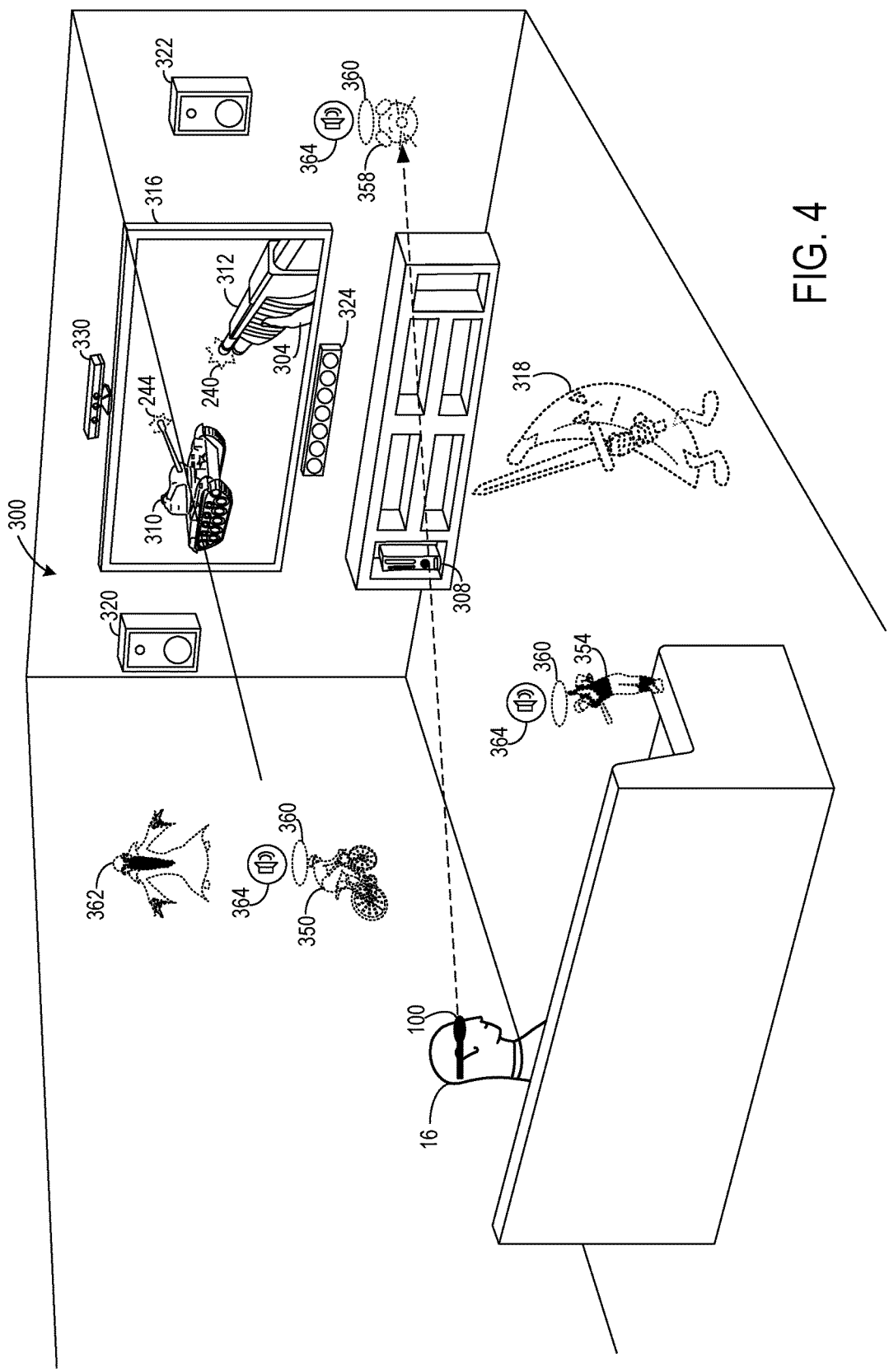
FIG. 4 shows a schematic perspective view of the room of FIG. 3 including multiple people and various computing devices for sharing content according to another example of the present disclosure.

In some examples, one or more additional or alternative visual indicators may be displayed to signify a functional characteristic of a particular group communication session. With reference now to FIG. 4, in one example an additional audio chat indicator 364 may be displayed with each group halo 360 to indicate to user 16 that a group communication session in the form of a live audio exchange is currently active with each of the first recipient Amy, second recipient Ben and third recipient Carlos. In other examples where the group communication session comprises the exchange of other types of data, such as streaming video, a different functional characteristic indicator may be displayed.

Additionally and as shown in FIG. 3, user 16 may locate each of the first avatar 350, second avatar 354, third avatar 358, and fourth avatar 362 in any desired locations in the living room 300. Advantageously and as illustrated in the example of FIG. 3, user 16 may locate each of the avatars in locations that do not obstruct or otherwise compromise the user's view of the display 316 that displays gameplay of the multiplayer game. In this manner, the user may have unobstructed visual access to the display 316 and associated gameplay, while also easily and quickly seeing which players are participating in the group communication session.

In some examples, user 16 may desire to engage in a private communication session with one or more of the players in the group communication session. In one example, the user 16 initially may engage in a group communication session with first recipient Amy, second recipient Ben and third recipient Carlos. In such group communication session, HMD device 100 of user 16 may transmit initial content, such as audio data, from the HMD device to each of the different recipient computing devices corresponding to first recipient Amy, second recipient Ben and third recipient Carlos. Similarly, audio data from each of the recipient computing devices may be transmitted to the other recipient computing devices and to HMD device 100.

Subsequently, the user 16 may desire to engage in a private communication session with third recipient Carlos. To cause such a private communication session to be established, user 16 may gaze at the third avatar 358 as indicated by the dotted line 370. The gaze tracking system of HMD device 100 may determine that user 16 is gazing at the third avatar 358 corresponding to recipient Carlos in a manner that triggers the creation of a private communication session. For example, the gaze tracking system may determine that user 16 gazes at the third avatar 358 for a period of time greater than a predetermined trigger period of time. In other examples any suitable gaze-related criteria may be utilized to trigger a private communication session. Based on determining that the user is gazing at the third avatar 358, the HMD device 100 and/or gaming console 308 may establish a private communication session between the HMD device 100 and the third recipient computing device 28 that is associated with the selected avatar and Carlos.

During such a private communication session, subsequent content (such as audio data captured by HMD device 100) may be transmitted from the HMD device 100 to the third recipient computing device 28, while not being transmitted to the other recipient computing devices associated with the other avatars and their corresponding recipients who are participating in the group communication session. Similarly, recipient content (such as audio data captured by the third recipient computing device 28) may be received by the HMD device 100 from the third recipient computing device 28, while such recipient content is not transmitted to nor received by the other recipient computing devices associated with the other avatars and their corresponding recipients who are participating in the group communication session. In this manner, the user 16 may easily and conveniently establish a private communication session with Carlos by simply gazing at Carlos' avatar.

In some examples, a visual indication of the private communication session may be displayed with the selected avatar corresponding to the recipient computing device participating in the private communication session. In the example of FIG. 3, upon establishing the private communication session with the third recipient computing device 28 corresponding to the third avatar 358, a visual indication of the private communication session in the form of the letter P may be displayed with the third avatar 358 by HMD device 100. In this manner, the user 16 may be quickly apprised that a private communication session with third recipient Carlos is underway. It will be appreciated that many other forms, shapes and visual indications may be utilized to visually convey the existence of a private communication session with a particular avatar/recipient.

In a similar manner, a visual indication of the private communication session may be displayed to the third recipient Carlos by the third recipient computing device 28, such as by displaying the letter P with an avatar that represents user 16. In some examples, the other participants of the group communication session also may see a displayed indication that the user 16 and Carlos are engaging in a private communication session. In other examples, the other participants of the group communication session are not provided an indication that the user 16 and Carlos are engaging in a private communication session, thus enabling the user and Carlos to communicate privately without alerting the other participants.

In some examples, content shared during a private communication session may be modified to indicate to the recipient that the content is exchanged as part of a private communication session. In one example where the content comprises audio data representing speech of the user 16 that is captured by the HMD device 100, such audio data may be modified to make it audibly distinct when broadcast as part of a private communication session, as compared to the audio data broadcast as part of a group communication session.

For example, where user 16 and third recipient Carlos are having a verbal conversation as part of a private communication session, the audio of the user's voice may be altered before being transmitted to the third recipient computing device 28, such as by auto-tuning or otherwise modulating the audio signal. In this manner, when such modified audio is broadcast to Carlos via the third recipient computing device 28, Carlos may quickly discern the altered nature of the audio, and thereby may be alerted that their conversation is part of a private communication session. In other examples, one or more other qualities and/or characteristics of the audio may be modified to make the broadcast audio distinctive as compared to audio broadcast as part of a group communication session. For example, audio from a private communication session may be modified to have a lower sound quality (e.g., to sound more grainy/scratchy).

Continuing with an example in which user 16 and third recipient Carlos are having a verbal conversation as part of a private communication session, HMD device 100 may receive recipient content in the form of audio data representing speech of Carlos that is captured by the third recipient computing device 28. In some examples, such audio data from third recipient computing device 28 may be broadcast by HMD device 100 to user 16 in a manner that causes the user to perceive the audio data as originating at a location of the corresponding third avatar 358 in the living room 300. For example, stereo speakers of the HMD device 100 may produce three dimensional audio output comprising audio output that provides the illusion that sound is originating from a particular location in the living room 300. In the example of FIG. 3, the audio data from third recipient computing device 28 may be broadcast by HMD device 100 as three dimensional audio output that causes the user 16 to perceive the audio data as originating at the third avatar 358 in the living room 300.

To create such spatially-located audio output, in some examples one or more crosstalk cancellation mechanisms are configured to deliver a first audio signal (e.g., left channel) to a first ear (e.g., left ear) and a second audio signal (e.g., right channel) to a second ear (e.g., right ear), while substantially attenuating the delivery of the first audio signal to the second ear and delivery of the second audio signal to the first ear. The provision of three dimensional audio may be based on a head-related transfer function "HRTF" and/or head-related impulse response "HRIR" to create the illusion that sound is originating from a particular location in 3D acoustic space. The HRTF describes how a given sound wave input is filtered by the diffraction and reflection properties of the head and pinna before the sound reaches the eardrum and inner ear. In other words, an HRTF may be defined based on the difference between a sound in free air and the sound as it arrives at the eardrum.

Figure 5:
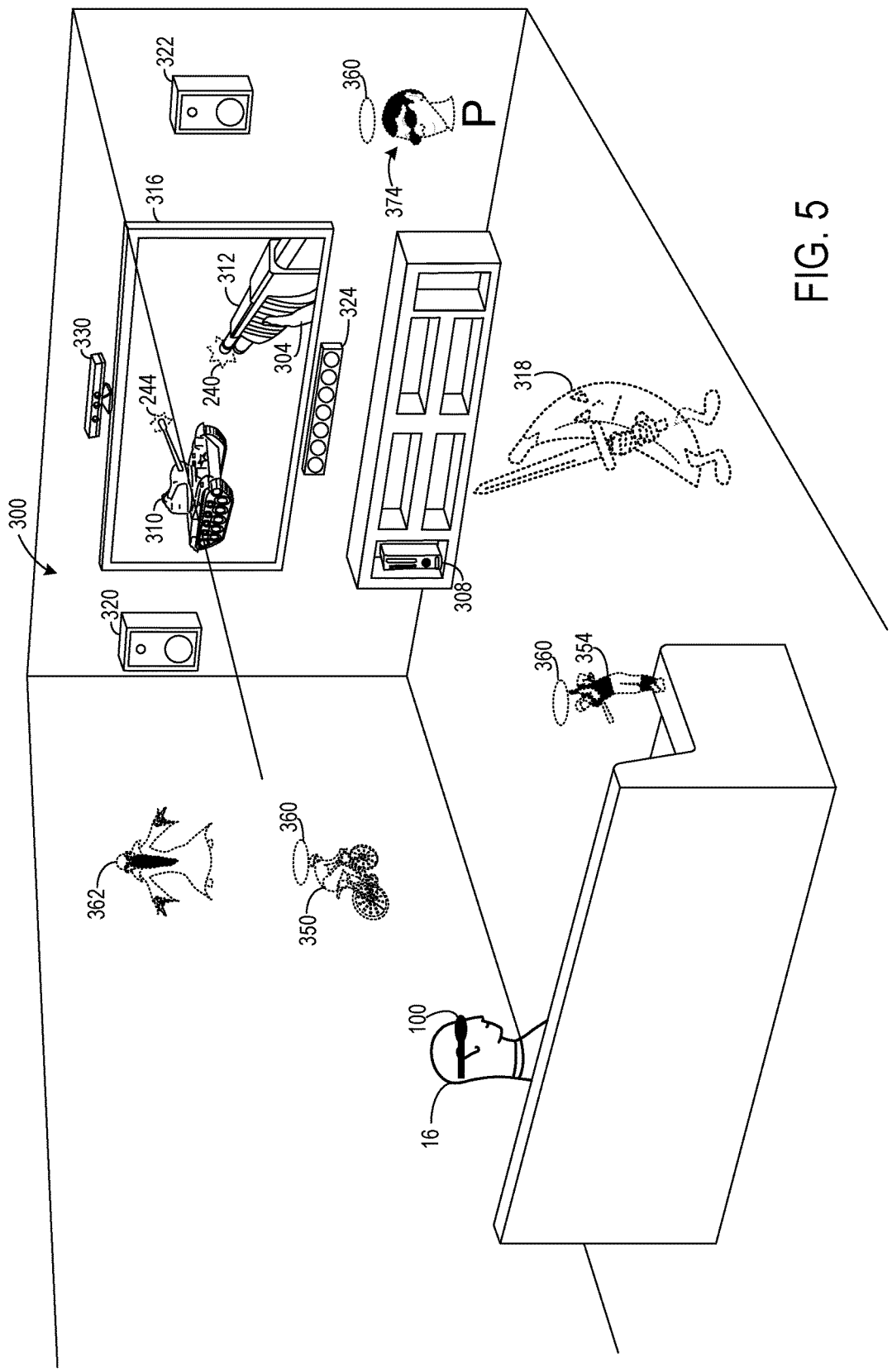
FIG. 5 shows a schematic perspective view of the room of FIG. 3 including multiple people and various computing devices for sharing content according to another example of the present disclosure.

In some examples, based on determining that a user is gazing at a selected avatar, the selected avatar may be changed into a live video feed from the recipient computing device that is associated with the selected avatar. With reference now to FIGS. 3 and 5, in one example the HMD device 100 may determine that the user 16 is gazing at the third avatar 358. In response and with reference to FIG. 5, the HMD device 100 may change the third avatar 358 into a live video feed 374 of Carlos, as captured by the third recipient computing device 28 or other camera, as part of establishing the private communication session.

In some examples, HMD device 100 may display the holographic avatars and the holographic sword-wielding banana 318 in a world-locked display mode to user 16. A world-locked holographic representation appears to be fixed relative to one or more real world objects viewable through the HMD device 100. In this manner, a wearer of the HMD device 100 may move around a real world physical environment while perceiving a world-locked hologram as remaining stationary in a fixed location and orientation relative to the real world objects in the physical environment. For example, during a group communication session the HMD device 100 may display each of the first avatar 350, second avatar 354, third avatar 358 and fourth avatar 362 in a world-locked display mode.

In some examples, HMD device 100 may display one or more of the holographic avatars and the holographic sword-wielding banana 318 in a body-locked display mode to user 16. In a body-locked display mode, a body-locked holographic representation appears to be fixed relative to the wearer of the HMD device 100, and the body-locked position of the holographic representation appears to be moveable relative to real-world objects and other world-locked holograms.

With reference again to FIG. 3, in some examples and during a private communication session, the HMD device 100 may display a selected avatar in a body-locked display mode to appear to be fixed relative to the user 16. At the same time, the HMD device 100 may display the other avatars in a world-locked display mode to appear to be fixed relative to the real world objects of the living room 300 viewable through the HMD device. In this manner, and in another potential advantage of the present disclosure, content may be transmitted from the HMD device 100 to the recipient computing device (e.g., the user and the recipient may continue a conversation) while the user moves or walks around, and the selected avatar is displayed by the HMD device in a body-locked mode to appear to be fixed relative to the user. Accordingly, the user may bring the selected avatar along and keep it within view as the user moves.

For example and with reference to FIG. 3, the HMD device 100 may display each of the avatars in a default world-locked display mode. The user 16 may gaze at the second avatar 354 to establish a private communication session with the second recipient Ben. The user 16 also may cause the HMD device 100 to display the second avatar 354 in a body-locked display mode, while the other avatars remain displayed in a world-locked display mode. For example, the user may speak a verbal command (i.e., "Display in body-lock") while gazing at the second avatar 354 to trigger the body-locked display mode. In other examples, establishing the private communication session by gazing at the second avatar 354 may programmatically cause the HMD device 100 to display the avatar in a body-locked display mode, while maintaining the other avatars in a world-lock display mode.

By displaying the second avatar 354 in a body-locked display mode, in some examples the user 16 may move around the living room 300 and/or walk to other rooms or physical spaces while maintaining visual contact with the second avatar. For example, in a body-locked display mode the second avatar 354 may appear fixed relative to the user 16, as if the avatar were mounted to the end of an invisible rod extending from the HMD device 100. In some examples the user 16 may adjust the position of the second avatar 354 in the body-locked display mode to any desirable location relative to HMD device 100.

Figure 6A:
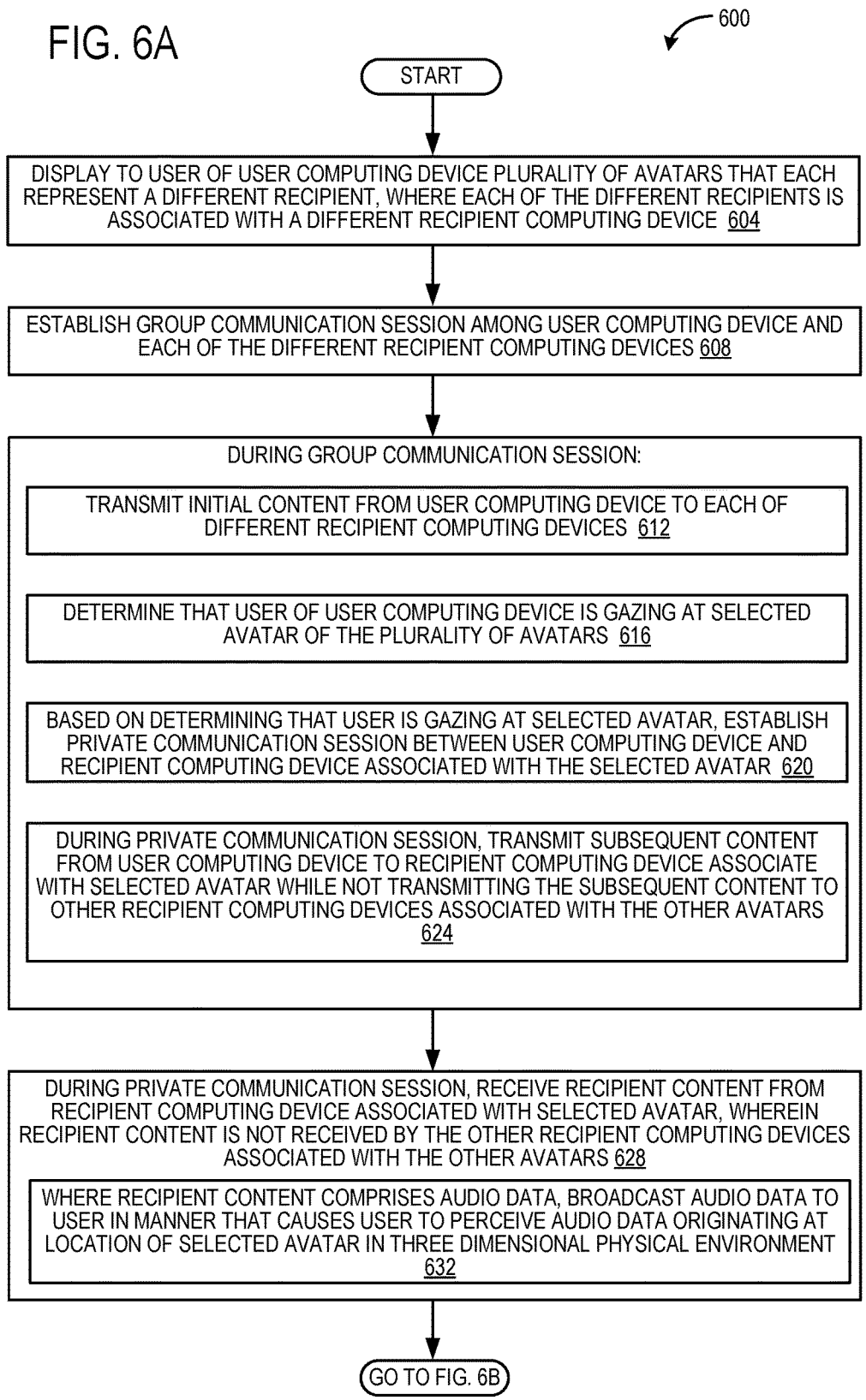

FIGS. 6A and 6I show a method 600 for transmitting content from a user computing device to at least one recipient computing device according to an example of the present disclosure. The following description of method 600 is provided with reference to the software and hardware components of the user computing device and recipient computing devices described above and shown in FIGS. 1-2. It will be appreciated that method 600 may also be performed in a variety of other contexts and using other suitable hardware and software components.

At 604 the method 600 may include displaying to a user of the user computing device a plurality of avatars, wherein each of the avatars represents a different recipient, and each of the different recipients is associated with a different recipient computing device. At 608 the method 600 may include establishing a group communication session among the user computing device and each of the different recipient computing devices. During the group communication session, the method 600 may include: at 612, transmitting initial content from the user computing device to each of the different recipient computing devices; at 616, determining that the user of the user computing device is gazing at a selected avatar of the plurality of avatars; at 620 and based on determining that the user is gazing at the selected avatar, establishing a private communication session between the user computing device and the recipient computing device that is associated with the selected avatar; and at 624, during the private communication session, transmitting subsequent content from the user computing device to the recipient computing device that is associated with the selected avatar while not transmitting the subsequent content to the one or more other recipient computing devices associated with the one or more other avatars of the plurality of avatars.

At 628 the method 600 may include, during the private communication session, receiving recipient content from the recipient computing device associated with the selected avatar, wherein the recipient content is not received by the one or more other recipient computing devices that are associated with the one or more other avatars of the plurality of avatars. At 632 the method 600 may include, where the recipient content comprises audio data, broadcasting the audio data to the user in a manner that causes the user to perceive the audio data as originating at a location of the selected avatar in a three dimensional physical environment.

With reference now to FIG. 6B, at 636 the method 600 may include wherein the initial content comprises initial audio data representing speech of the user captured by the user computing device. At 640 the method 600 may include wherein the subsequent content comprises subsequent audio data representing speech of the user subsequently captured by the user computing device, modifying the subsequent audio data to make it audibly distinct when broadcast as compared to the initial audio data when broadcast. At 644 the method 600 may include wherein the user computing device is a head-mounted display device comprising an at least partially see-through display through which the user views a three dimensional physical environment and the plurality of avatars are holograms displayed via the head-mounted display device to appear in the three dimensional physical environment.

At 648 the method 600 may include displaying the selected avatar via a head-mounted display device to appear to be fixed relative to the use. At 652 the method 600 may include displaying the one or more other avatars via the head-mounted display device to appear to be fixed relative to real world objects viewable through the head-mounted display device. At 656 the method 600 may include, during the private communication session, transmitting the subsequent content from the user computing device to the recipient computing device while the user moves in the three dimensional physical environment and the selected avatar is displayed to appear to be fixed relative to the user.

At 660 the method 600 may include displaying with the selected avatar a visual indication of the private communication session. At 664 the method 600 may include, during the group communication session, displaying a grouping indication with each of the plurality of avatars. At 668 the method 600 may include, based on determining that the user is gazing at the selected avatar, changing the selected avatar into a live video feed from the recipient computing device that is associated with the selected avatar.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

Figure 7:
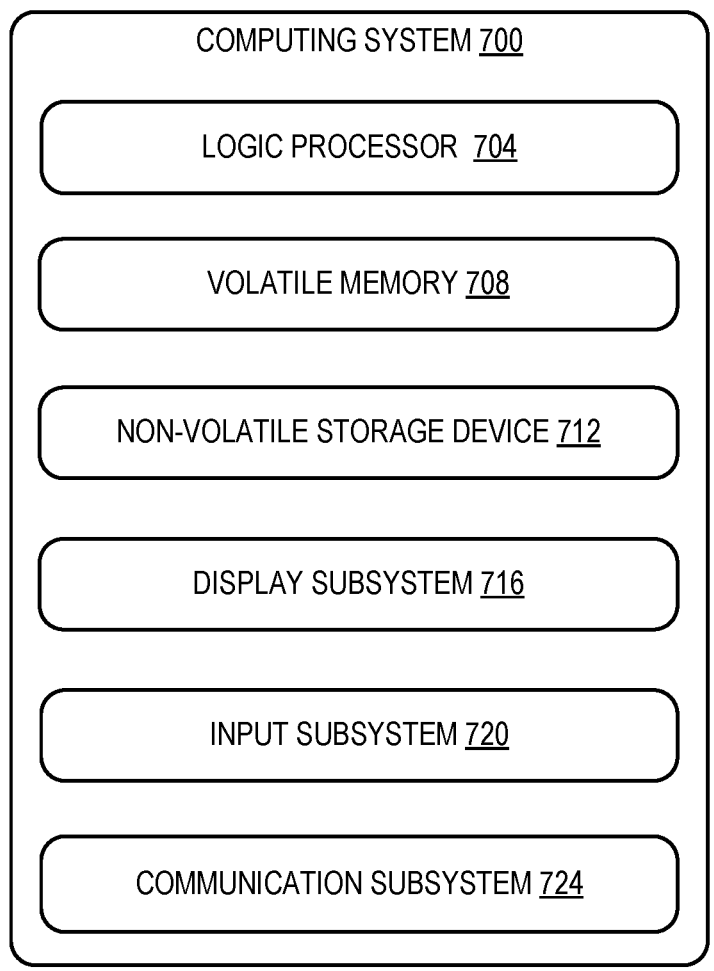
FIG. 7 shows a simplified schematic illustration of computing system.

FIG. 7 schematically shows a non-limiting embodiment of a computing system 700 that can enact one or more of the methods and processes described above. Computing system 700 is shown in simplified form. Computing system 700 may take the form of user computing device 14, server 32 or a recipient computing device as shown in FIG. 1, computing device 124 shown in FIG. 2, or one or more other devices integrated in or otherwise communicatively coupled with HMD device 100 (e.g., personal computers, server computers, tablet computers, home-entertainment computers, network computing devices, gaming devices, mobile computing devices, mobile communication devices (e.g., smart phone), and/or other computing devices).

Computing system 700 includes a logic processor 704, volatile memory 708, and a non-volatile storage device 712. Computing system 700 may optionally include a display subsystem 716, input subsystem 720, communication subsystem 724, and/or other components not shown in FIG. 7.

Logic processor 704 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 704 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 708 may include physical devices that include random access memory. Volatile memory 708 is typically utilized by logic processor 704 to temporarily store information during processing of software instructions. It will be appreciated that volatile memory 708 typically does not continue to store instructions when power is cut to the volatile memory 708.

Non-volatile storage device 712 includes one or more physical devices configured to hold instructions executable by the logic processors to implement the methods and processes described herein. When such methods and processes are implemented, the state of non-volatile storage device 712 may be transformed—e.g., to hold different data.

Non-volatile storage device 712 may include physical devices that are removable and/or built-in. Non-volatile storage device 712 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 712 may include nonvolatile, dynamic, static, read/write, read-only, sequential-access, location-addressable, file-addressable, and/or content-addressable devices. It will be appreciated that non-volatile storage device 712 is configured to hold instructions even when power is cut to the non-volatile storage device 712.

Aspects of logic processor 704, volatile memory 708, and non-volatile storage device 712 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic processor 704 executing instructions held by non-volatile storage device 712, using portions of volatile memory 708. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 716 may be used to present a visual representation of data held by non-volatile storage device 712. As the herein described methods and processes change the data held by the non-volatile storage device, and thus transform the state of the non-volatile storage device, the state of display subsystem 716 may likewise be transformed to visually represent changes in the underlying data. Display subsystem 716 may include one or more display devices utilizing virtually any type of technology. Such display devices may be combined with logic processor 704, volatile memory 708, and/or non-volatile storage device 712 in a shared enclosure. With respect to the example HMD device 100 of FIG. 2, the display panels 104R and 104L configured to visually augment an appearance of a real-world, three dimensional physical environment by displaying virtual objects such as holograms are an example of a display subsystem 716.

When included, input subsystem 720 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; electric-field sensing componentry for assessing brain activity; any of the sensors described above with respect to HMD device 100; and/or any other suitable sensor.

When included, communication subsystem 724 may be configured to communicatively couple computing system 700 with one or more other computing devices. Communication subsystem 724 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

The following paragraphs provide additional support for the claims of the subject application. One aspect provides a method for transmitting content from a user computing device to at least one recipient computing device, the method comprising: displaying to a user of the user computing device a plurality of avatars, wherein each of the avatars represents a different recipient, and each of the different recipients is associated with a different recipient computing device; establishing a group communication session among the user computing device and each of the different recipient computing devices; and during the group communication session: transmitting initial content from the user computing device to each of the different recipient computing devices; determining that the user of the user computing device is gazing at a selected avatar of the plurality of avatars; based on determining that the user is gazing at the selected avatar, establishing a private communication session between the user computing device and the recipient computing device that is associated with the selected avatar; and during the private communication session, transmitting subsequent content from the user computing device to the recipient computing device associated with the selected avatar while not transmitting the subsequent content to the one or more other recipient computing devices associated with the one or more other avatars of the plurality of avatars. The method may additionally or optionally include, during the private communication session, receiving recipient content from the recipient computing device associated with the selected avatar, wherein the recipient content is not received by the one or more other recipient computing devices that are associated with the one or more other avatars of the plurality of avatars. The method may additionally or optionally include, wherein the recipient content comprises audio data, broadcasting the audio data to the user in a manner that causes the user to perceive the audio data as originating at a location of the selected avatar in a three dimensional physical environment. The method may additionally or optionally include, wherein the initial content comprises initial audio data representing speech of the user captured by the user computing device. The method may additionally or optionally include, wherein the subsequent content comprises subsequent audio data representing speech of the user subsequently captured by the user computing device, modifying the subsequent audio data to make it audibly distinct when broadcast as compared to the initial audio data when broadcast. The method may additionally or optionally include, wherein the user computing device is a head-mounted display device comprising an at least partially see-through display through which the user views a three dimensional physical environment, and the plurality of avatars are holograms displayed via the head-mounted display device to appear in the three dimensional physical environment. The method may additionally or optionally include, wherein the user computing device is a head-mounted display device comprising an at least partially see-through display through which the user views a three dimensional physical environment: displaying the selected avatar via the head-mounted display device to appear to be fixed relative to the user; displaying the one or more other avatars via the head-mounted display device to appear to be fixed relative to real world objects viewable through the head-mounted display device; and during the private communication session, transmitting the subsequent content from the user computing device to the recipient computing device while the user moves in the three dimensional physical environment and the selected avatar is displayed to appear to be fixed relative to the user. The method may additionally or optionally include, displaying with the selected avatar a visual indication of the private communication session. The method may additionally or optionally include, during the group communication session, displaying a grouping indication with each of the plurality of avatars. The method may additionally or optionally include, based on determining that the user is gazing at the selected avatar, changing the selected avatar into a live video feed from the recipient computing device that is associated with the selected avatar.

Another aspect provides a head-mounted display device, comprising: an at least partially see-through display; a processor; and a memory holding instructions executable by the processor to: display to a user of the head-mounted display device a plurality of avatars via the at least partially see-through display, wherein each of the avatars represents a different recipient, and each of the different recipients is associated with a different recipient computing device; establish a group communication session among the head-mounted display device and each of the different recipient computing devices; and during the group communication session: transmit initial content from the head-mounted display device to each of the different recipient computing devices; determine that the user of the head-mounted display device is gazing at a selected avatar of the plurality of avatars; based on determining that the user is gazing at the selected avatar, establish a private communication session between the head-mounted display device and the recipient computing device that is associated with the selected avatar;

and during the private communication session, transmit subsequent content from the head-mounted display device to the recipient computing device that is associated with the selected avatar while not transmitting the subsequent content to the one or more other recipient computing devices associated with the one or more other avatars of the plurality of avatars. The head-mounted display device may additionally or alternatively include, wherein the instructions are executable by the processor to, during the private communication session, receive recipient content from the recipient computing device associated with the selected avatar, wherein the recipient content is not received by the one or more other recipient computing devices that are associated with the one or more other avatars of the plurality of avatars. The head-mounted display device may additionally or alternatively include, wherein the recipient content comprises audio data, and the instructions are executable by the processor to broadcast the audio data to the user in a manner that causes the user to perceive the audio data as originating at a location of the selected avatar in a three dimensional physical environment. The head-mounted display device may additionally or alternatively include, wherein the initial content comprises initial audio data representing speech of the user captured by the head-mounted display device. The head-mounted display device may additionally or alternatively include, wherein the subsequent content comprises subsequent audio data representing speech of the user subsequently captured by the head-mounted display device, and the instructions are executable by the processor to modify the subsequent audio data to make it audibly distinct when broadcast as compared to the initial audio data when broadcast. The head-mounted display device may additionally or alternatively include, wherein the plurality of avatars are holograms displayed to appear in a three dimensional physical environment viewed by the user through the at least partially transparent display. The head-mounted display device may additionally or alternatively include, wherein the instructions are executable by the processor to: display the selected avatar to appear to be fixed relative to the user; display the one or more other avatars to appear to be fixed relative to real world objects viewable through the at least partially see-through display; and during the private communication session, transmit the subsequent content from the head-mounted display device to the recipient computing device while the user moves in the three dimensional physical environment and the selected avatar is displayed to appear to be fixed relative to the user. The head-mounted display device may additionally or alternatively include, wherein the instructions are executable by the processor to display with the selected avatar a visual indication of the private communication session. The head-mounted display device may additionally or alternatively include, wherein the instructions are executable by the processor to, based on determining that the user is gazing at the selected avatar, change the selected avatar into a live video feed from the recipient computing device that is associated with the selected avatar.

Another aspect provides a head-mounted display device, comprising: an at least partially see-through display; a processor; and a memory holding instructions executable by the processor to: display to a user of the head-mounted display device a plurality of avatars via the at least partially see-through display, wherein each of the avatars represents a different recipient, and each of the different recipients is associated with a different recipient computing device; establish a group communication session among the head-mounted display device and each of the different recipient computing devices; and during the group communication session: transmit initial content from the head-mounted display device to each of the different recipient computing devices; determine that the user of the head-mounted display device is gazing at a selected avatar of the plurality of avatars; based on determining that the user is gazing at the selected avatar, establish a private communication session between the head-mounted display device and the recipient computing device that is associated with the selected avatar; (luring the private communication session, display with the selected avatar a visual indication of the private communication session; and during the private communication session, transmit subsequent content from the head-mounted display device to the recipient computing device that is associated with the selected avatar while not transmitting the subsequent content to the one or more other recipient computing devices that are associated with the one or more other avatars of the plurality of avatars.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for transmitting content from a user computing device to at least one recipient computing device, the method comprising:
    displaying to a user of the user computing device a plurality of avatars, wherein each of the avatars represents a different recipient, and each of the different recipients is associated with a different recipient computing device;
    establishing a group communication session among the user computing device and each of the different recipient computing devices;
    during the group communication session:
        transmitting initial content from the user computing device to each of the different recipient computing devices;
        determining that the user of the user computing device is gazing at a selected avatar of the plurality of avatars;
        based on determining that the user is gazing at the selected avatar, establishing a private communication session between the user computing device and the recipient computing device that is associated with the selected avatar; and
        during the private communication session, transmitting subsequent content from the user computing device to the recipient computing device associated with the selected avatar while not transmitting the subsequent content to the one or more other recipient computing devices associated with one or more other avatars of the plurality of avatars;
    wherein the initial content comprises initial audio data representing speech of the user captured by the user computing device, and the subsequent content comprises subsequent audio data representing speech of the user subsequently captured by the user computing device, the method further comprising modulating the subsequent audio data representing speech of the user to make it audibly distinct when broadcast as compared to the initial audio data representing speech of the user when broadcast.

2. The method of claim 1, further comprising during the private communication session, receiving recipient content from the recipient computing device associated with the selected avatar, wherein the recipient content is not received by the one or more other recipient computing devices that are associated with the one or more other avatars of the plurality of avatars.

3. The method of claim 2, wherein the recipient content comprises audio data, the method further comprising broadcasting the audio data to the user in a manner that causes the user to perceive the audio data as originating at a location of the selected avatar in a three dimensional physical environment.

4. The method of claim 1, wherein the user computing device is a head-mounted display device comprising an at least partially see-through display through which the user views a three dimensional physical environment, and the plurality of avatars are holograms displayed via the head-mounted display device to appear in the three dimensional physical environment.

5. The method of claim 1, wherein the user computing device is a head-mounted display device comprising an at least partially see-through display through which the user views a three dimensional physical environment, the method further comprising:
displaying the selected avatar via the head-mounted display device to appear to be fixed relative to the user;
displaying the one or more other avatars via the head-mounted display device to appear to be fixed relative to real world objects viewable through the head-mounted display device; and
during the private communication session, transmitting the subsequent content from the user computing device to the recipient computing device while the user moves in the three dimensional physical environment and the selected avatar is displayed to appear to be fixed relative to the user.

6. The method of claim 1, further comprising displaying with the selected avatar a visual indication of the private communication session.

7. The method of claim 1, further comprising during the group communication session, displaying a grouping indication with each of the plurality of avatars.

8. The method of claim 1, further comprising, based on determining that the user is gazing at the selected avatar, changing the selected avatar into a live video feed from the recipient computing device that is associated with the selected avatar.

9. A head-mounted display device, comprising:
an at least partially see-through display;
a processor; and
a memory holding instructions executable by the processor to:
display to a user of the head-mounted display device a plurality of avatars via the at least partially see-through display, wherein each of the avatars represents a different recipient, and each of the different recipients is associated with a different recipient computing device;
establish a group communication session among the head-mounted display device and each of the different recipient computing devices; and
during the group communication session:
transmit initial content from the head-mounted display device to each of the different recipient computing devices;
determine that the user of the head-mounted display device is gazing at a selected avatar of the plurality of avatars;
based on determining that the user is gazing at the selected avatar, establish a private communication session between the head-mounted display device and the recipient computing device that is associated with the selected avatar; and
during the private communication session, transmit subsequent content from the head-mounted display device to the recipient computing device that is associated with the selected avatar while not transmitting the subsequent content to the one or more other recipient computing devices associated with one or more other avatars of the plurality of avatars;
wherein the initial content comprises initial audio data representing speech of the user captured by the head-mounted display device, and the subsequent content comprises subsequent audio data representing speech of the user subsequently captured by the head-mounted display device; and the instructions are executable by the processor to modulate the subsequent audio data representing speech of the user to make it audibly distinct when broadcast as compared to the initial audio data representing speech of the user when broadcast.

10. The head-mounted display device of claim 9, wherein the instructions are executable by the processor to, during the private communication session, receive recipient content from the recipient computing device associated with the selected avatar, wherein the recipient content is not received by the one or more other recipient computing devices that are associated with the one or more other avatars of the plurality of avatars.

11. The head-mounted display device of claim 10, wherein the recipient content comprises audio data, and the instructions are executable by the processor to broadcast the audio data to the user in a manner that causes the user to perceive the audio data as originating at a location of the selected avatar in a three dimensional physical environment.

12. The head-mounted display device of claim 9, wherein the plurality of avatars are holograms displayed to appear in a three dimensional physical environment viewed by the user through the at least partially transparent display.

13. The head-mounted display device of claim 9, wherein the instructions are executable by the processor to:
display the selected avatar to appear to be fixed relative to the user;
display the one or more other avatars to appear to be fixed relative to real world objects viewable through the at least partially see-through display; and
during the private communication session, transmit the subsequent content from the head-mounted display device to the recipient computing device while the user moves in a three dimensional physical environment and the selected avatar is displayed to appear to be fixed relative to the user.

14. The head-mounted display device of claim 9, wherein the instructions are executable by the processor to display with the selected avatar a visual indication of the private communication session.

15. The head-mounted display device of claim 9, wherein the instructions are executable by the processor to, based on determining that the user is gazing at the selected avatar, change the selected avatar into a live video feed from the recipient computing device that is associated with the selected avatar.

16. A head-mounted display device, comprising:
an at least partially see-through display;
a processor; and
a memory holding instructions executable by the processor to:
 display to a user of the head-mounted display device a plurality of avatars via the at least partially see-through display, wherein each of the avatars represents a different recipient, and each of the different recipients is associated with a different recipient computing device;
 establish a group communication session among the head-mounted display device and each of the different recipient computing devices; and
 during the group communication session:
  transmit initial content from the head-mounted display device to each of the different recipient computing devices;
  determine that the user of the head-mounted display device is gazing at a selected avatar of the plurality of avatars;
  based on determining that the user is gazing at the selected avatar, establish a private communication session between the head-mounted display device and the recipient computing device that is associated with the selected avatar;
  during the private communication session, display with the selected avatar a visual indication of the private communication session; and
  during the private communication session, transmit subsequent content from the head-mounted display device to the recipient computing device that is associated with the selected avatar while not transmitting the subsequent content to the one or more other recipient computing devices that are associated with one or more other avatars of the plurality of avatars;
 wherein the initial content comprises initial audio data representing speech of the user captured by the head-mounted display device, and the subsequent content comprises subsequent audio data representing speech of the user subsequently captured by the head-mounted display device, and the instructions are executable by the processor to modulate the subsequent audio data representing speech of the user to make it audibly distinct when broadcast as compared to the initial audio data representing speech of the user when broadcast.

* * * * *